United States Patent [19]

Mizuno

[11] Patent Number: 5,040,009
[45] Date of Patent: Aug. 13, 1991

[54] CARTRIDGE FOR PHOTOGRAPHIC PHOTOSENSITIVE MATERIALS

[75] Inventor: Kazunori Mizuno, Kanagawa, Japan

[73] Assignee: Fuji Photo Film Co., Ltd., Minami-ashigara, Japan

[21] Appl. No.: 623,207

[22] Filed: Dec. 6, 1990

[30] Foreign Application Priority Data

Dec. 7, 1989 [JP] Japan ............................... 1-316544

[51] Int. Cl.$^5$ ............................................. G03B 17/26
[52] U.S. Cl. ................................................. 354/275
[58] Field of Search ........................ 354/275, 276, 216; 242/71-71.7; 95/39

[56] References Cited

U.S. PATENT DOCUMENTS 3,682,068  8/1972  Stieger et al. ............................ 95/39
4,616,914 10/1986  Buelens et al. ....................... 354/275
4,861,695  1/1989  Higashiyama ................... 354/275 X

*Primary Examiner*—L. T. Hix
*Assistant Examiner*—Jae N. Noh
*Attorney, Agent, or Firm*—Burns, Doane, Swecker & Mathis

[57] ABSTRACT

A cartridge for photographic photosensitive materials has the internal volume of not more than $0.07 \times cm^3$ ($X$ is a surface area of the photosensitive layer of the photographic photosensitive material contained in it), and a cartridge body, a spool and a photographic film. The cartridge body is made of a plastic material having a sulfur content of not more than 2.5 $\mu g/g$, and made of a carbon black produced from petroleum material at more than 1300° C. or produced from natural gas or vegetable oil.

6 Claims, 1 Drawing Sheet

CARTRIDGE FOR PHOTOGRAPHIC PHOTOSENSITIVE MATERIALS

BACKGROUND OF THE INVENTION

This invention relates to a cartridge for photographic photosensitive materials wherein the components contained in the plastic material forming it rarely deteriorate the properties of a photographic photosensitive materials placed in it.

In general, a cartridge for photographic photosensitive materials is composed of a cartridge body 1 in an about cylindrical shape and a spool 2 rotatably attached to the container body 1 as shown in FIG. 1. A film 3 is wound on the spool 2, and extended through a slit 4 of the cartridge body 1.

Heretofore, such a kind of the cartridge body of the cartridge for a photographic photosensitive materials is made of various plastic materials, such as polypropylene resin, polystyrene resin and acrylonitrile-butadiene-styrene copolymer resin, which are blended with carbon black in order to secure light-shielding ability (Japanese Patent KOKAI No. 50-33831).

Besides, in some cartridges for photographic photosensitive materials, a spool is attached to the cartridge body rotatably, and a film wound on the spool is extended by rotating the spool (U.S. Pat. No. 4,832,275, U.S. Pat. No. 4,834,306). In this type cartridge for photographic photosensitive materials, the cartridge body is made of the above-mentioned plastic materials, too.

However, the above conventional cartridge for photographic photosensitive materials occasionally deteriorated the properties of the photographic photosensitive material placed therein, resulting to render the photographic photosensitive material useless.

SUMMARY OF THE INVENTION

An obJect of the invention is to provide a cartridge for photographic photosensitive materials not deteriorating the photographic property of the photographic photosensitive material placed therein, particularly even when it is kept at a high temperature.

The inventor investigated as to the cause of deteriorating the photographic property of photographic photosensitive materials, and found that sulfur components contained in the plastic material forming the cartridge body affects adversely the photographic photosensitive materials, and further found that the sulfur components are derived from carbon black, antioxidant, rubber crosslinking agent added for improving the impact strength of polystyrenic resin, and then accomplished the invention.

Thus, the present invention provides a cartridge for photographic photosensitive materials of which the internal volume is not more than $0.07 \times cm^3$ (X is a surface area of the photosensitive layer of the photographic photosensitive material contained in it, and of which a cartridge body is made of a plastic material having a sulfur content of not more than 2.5 $\mu g/g$.

Figure 1:
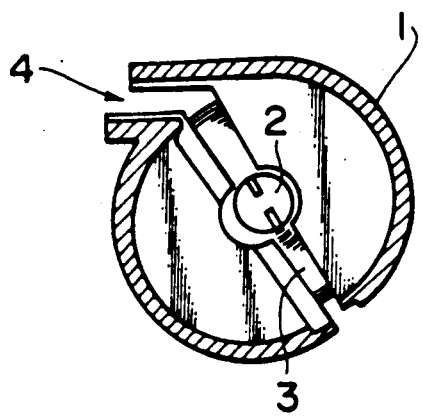
FIG. 1 is a sectional view illustrating a partially detached state of the cartridge for photographic photosensitive materials.

1 ... cartridge body
2 ... spool
3 ... photographic photosensitive material
4 ... slit

DETAILED DESCRIPTION OF THE INVENTION

The cartridge applicable to the invention includes JIS 135 film cartridges, JIS 126 film cartridges, JIS 110 film cartridges, disk film cartridges, film magazines and the like.

In the cartridge for photographic photosensitive materials of the invention, the internal volume is not more than $0.07 \times cm^2$ (X is the surface area ($cm^2$) of the photosensitive layer of the photosensitive material contained in it). The internal volume is the void space between the inner surface of the cartridge body and the outermost surface of the photosensitive material placed in the cartridge. The cartridge can be miniaturized by rendering the internal volume not more than $0.07 \times cm^3$. The internal volume is preferably not more than $0.06 \times cm^3$, more preferably, not more than $0.05 \times cm^3$.

The cartridge body of the invention is composed of a plastic material having a sulfur content of not more than 2.5 $\mu g/g$, preferably not more than 2.0 $\mu g/g$. When the sulfur content is beyond 2.5 $\mu g/g$, the photographic property is deteriorated. That is, as a result of the inventor's investigation, it was found that, when free sulfur components contained in a carbon black is beyond about 17 ppm/g, the photographic property is deteriorated. The carbon black is blended with the plastic material in an amount of about 15 wt. % at maximum. Therefore, when the sulfur component in the cartridge body is less than about 2.5 $\mu g/g$, the photographic property is not deteriorated.

The carbon black added to the cartridge body of the invention includes the carbon black produced by using natural gas or vegetable oil as the raw material such as thermal black and channel black and the carbon black produced at more than 1300° C. by using petroleum as the raw material. The thermal black the chennel and the like are used as it is, because the sulfur content is very low. However, since the oil furnace black, the lamp black, etc. produced by using a petroleum raw material, for example, an aromatic oil such as creosote oil, naphthalene oil, anthracene oil or heavy oil containes sulfur components, extractable sulfur components are necessary to be decreased by binding sulfur components to the carbon black during the production of it. The burning temperature is accordingly more than 1300° C. and preferably the passing time through a reaction furnace is controlled to be 0.02 second.

A rubber material is blended with the plastic material such as polystyrene resin in order to improve the impact strength. The rubber material has a molecular crosslinking structure in order to impart elasticity. Sulfur compounds are usable as the crosslinking agent (for example, the compounds described on pages 89 to 92 of "Separation and Analysis Techniques of Polymer Additives" published by Nihon Kagaku Gijutsu Joho). When the above sulfur compound is used as the crosslinking agent, the content of the sulfur compound is controlled so as to be not more than 2.5 $\mu g/g$. Moreover, preferable crosslinking agents used for the invention are described on pages 871 to 879 and pages 921 to 924 of "Plastic and Rubber Additives Manual, Enlarged Edition" published by Kagaku Kogyo-Sha.

The resins usable as the plastic material include ethylene-butene-1 copolymer resin, propylene-butene-1 copolymer resin, ethylene-propylene-butene-1 ternary copolymer resin, polybutene-1 resin, styrene resin, polymethyl methacrylate resin, styrene-acrylonitrile copolymer resin, ABS resin, polypropylene resin, crystalline propylene-α-olefin copolymer resin, modified polypropylene resin, modified polyethylene resin, polypropylene-maleic acid graft copolymer resin, chlorinated polyolefin resin (mainly chlorinated polyethylene resin), ethylene ionomer resin (a resin where ethylene and an unsaturated acid is crosslinked with a metal) poly-4-methyl-pentene-1 resin, vinyl chloride propylene copolymer resin, ethylene-vinylalchohol resin, crosslinked polyethylene resin (electron rays irradiation crosslinking, chemical corsslinking, etc.), polyisobutylene resin 1,2-polybutadiene resin, L-LDPE (linear low density polyethylene) resin, LDPE (low density polyethylene) resin, MDPE (medium density polyethylene) resin, EEA (ethylene-ethyl acrylate copolymer) resin, EVA (ethylene-vinyl acetate copolymer) resin, propylene-ethylene copolymer resin and the like.

Example of the usable for the invention additives are described below.

(1) Plasticizer;
  phthalic acid esters, glycol esters, fatty acid esters, phosphoric acid esters, etc.
(2) Stabilizer;
  lead compounds, cadmium compounds, zinc compounds, alkaline earth metal compounds, organic tin compounds, etc.
(3) Antistatic agent;
  cationic surfactants, anionic surfactants, nonionic surfactants, ampholytic surfactants, etc.
(4) Flame retardant;
  phosphoric acid esters, phosphoric acid ester halides, halides, inorganic materials, polyols containing phosphor, etc.
(5) Filler;
  alumina, kaolin, clay, calcium caronate, mica, talc, titanium dioxide, silica, etc.
(6) Reinforcing agent;
  glass lobing, metallic fiber, glass fiber, glass milled fiber, carbon fiber, etc.
(7) Coloring agent;
  inorganic pigments (Al, $Fe_2O_3$, $TiO_2$, ZnO, CdS, etc.), organic pigments (carbon black, dyes), etc.
(8) Blowing agent;
  inorganic blowing agents (ammonium carbonate, sodium hydrogen carbonate, etc.), organic blowing agents (nitroso compounds, azo compounds, etc.)
(9) Deterioration preventing agent;
  ultraviolet absorber, metal deactivator, peroxide decomposing agent, etc.
(10) Coupling agent;
  silane compounds, titanium compounds, chromium compounds, aluminum compounds, etc.

In the cartridge for photographic photosensitive materials of the invention, since the sulfur content of the plastic material is not more than 2.5 μg/g, the photographic photosensitive material placed therein is rarely deteriorated by the sulfur component. The sulfur component of the plastic material is made not more than 2.5 μg/g by using a difinite amount of restricted carbon black.

EXAMPLES

Example 1

The plastic material employed is composed of 68.5 wt. % of polystyrene resin, 30 wt. % butadiene-styrene copolymer resin crosslinked with 1 wt. % of diisopropylbenzenehydroperoxide and 0.5 wt. % of acetylene black (a kind of thermal black).

Example 2

The plastic material employed is composed of 66 wt. % of polystyrene resin, 30 wt. % of butadiene-styrene copolymer resin crosslinked with 1 wt. % of diisopropylbenzenehydroperoxide and 3.0 wt. % of oil furnace carbon black. The furnace carbon black was made from creosote oil as the raw material at 1350° C. of the furnace temperature for 0.02 second of a passing time through the furnace.

Example 3

Thed plastic material employed is the same as Example 2 except of using acetylene black instead of the oil furnace carbon black.

Comparative Example 1

The plastic material employed is composed of 76.5 wt. % of polystyrene resin, 20 wt. % of butadiene-styrene copolymer resin corsslinked with 3 wt. % of sulfur, and 0.5 wt. % of acetylene black.

Comparative Example 2

The plastic material employed is the same as Example 2 except of using oil furnace carbon black made from creosote oil as the raw material at 1250° C. of the furnace temperature for 0.02 second of a passing time through the furnace.

Cartridges for photographic photosensitive materials shown in FIG. 1 were molded by an injection molding machine (produced by Sumitomo Heavy Industries) at 150 t of a mold clamping pressure using the above-mentioned plastic materials. Each cartridge for photographic photosensitive material was about 5 g in weight. A 24 exposure film in the 135 size (produced by FuJi PHoto Film Co., Ltd., "FUJI COLOR SUPER HG 400") was loaded in each cartridge. The surface area of the photosensitive layer of the film was 403 $cm^2$, and the internal volume of the cartridge was 17.2 $cm^3$.

Each cartridge for photographic photosensitive materials wherein the film was loaded was kept at 25° C. under 50% of a relative humidity for two days. Then, it was placed in a container in seal, and further kept at 60° C. for three days. The color development of the film was conducted by using a development process CN-16 (indicated by FuJi Photo Film Co., Ltd.). The results are shown in the following table.

| | Measured Value of Sulfur Content | Difference of (BL) Photosensitiveness |
| --- | --- | --- |
| Example 1 | less than the detectable limit | −0.01 |
| Example 2 | less than the detectable limit | −0.02 |
| Example 3 | less than the detectable limit | −0.01 |
| Comparative Example 1 | 12 μg/g | −0.05 |
| Comparative Example 2 | 21 μg/g | −0.20 |

Measuring method of sulfur component content;

An molded article made of the plastic material was hardened by cooling with liquid nitrogen and then ground, 100 g of the ground sample was placed in a Soxhlet extractor and is extracted with chloroform at 60° C. for 8 hours, and after cooling, the whole amount of the solution was adjusted to 100 ml. 10 μl of the solution was injected into an apparatus of high speed liquid chromatography (HPLC), and the content of the sulfur component was measured quantitatively.

The standard HPLC conditions are as follows;

Column: ODS silica gel column (4.6$\phi \times$150 mm)
Eluent: methanol: water=95 : 5 (containing each 0.1% of acetic acid and triethylamine)
Flow rate: 1 ml/min.
Detecting wavelength: 254 nm Sulfur is eluted after about 6.5 minutes. The determination is conducted by the absolute calibration curve method, and the detectable limit is 1 ppm.

Photosensitive difference measuring method

The decrease of photosensitivity of a blue photosensitive layer (BL) was measured using a sample kept at a room temperature as the standard.

An exposure value E of a fogging density value plus 1.0 was determined by the measuring result of the density of the sample kept in a room temperature, the density value in the exposure value E is referred to as $D_0$. Subsequently, the density value of the sample kept at 60° C. for three days is referred to as $D_{60}$, and the density difference was calculated by the formula ($D_{60}-D_0$). The density difference was used as the photosensitive difference.

The above results indicate that the example of which the sulfur content was small had a very small photosensitive difference and a little deterioration of the photographic property.

I claim:

1. In a cartridge for photographic photosensitive materials of which the internal volume is not more than 0.07$\times$cm$^3$ ($\times$ is a surface area of the photosensitive layer of the photographic photosensitive material contained in it), the improvement comprising that the cartridge body is made of a plastic material having a sulfur content of not more than 2.5 $\mu$g/g.

2. The cartridge for photographic photosensitive materials of claim 1 of which the internal volume is not more than 0.05$\times$cm$^3$.

3. In a cartridge for photographic photosensitive materials of which the internal volume is not more than 0.07$\times$cm$^3$ ($\times$ is a surface area of the photosensitive layer of the photographic photosensitive material contained in it), the improvement comprising that the cartridge body is made of a plastic material containing 0.05 to 15.0 wt. % of a carbon black produced from petroleum material at more than 1300° C., or produced from a natural gas or vegetable oil.

4. The cartridge for photograhic photosensitive materials of claim 3 wherein the carbon black is theremal black and channel black.

5. The cartridge for photographic photosensitive material of claim 3 wherein the carbon black is produced from petroleum as the raw material at more than 1300° C. for about 0.02 second of the passing time through a furnace.

6. A cartridge for photographic photosensitive materials consisting essentially of a cartridge body, a spool rotatably attached to the cartridge body and a photographic film wound on the spool, the cartridge body being made of a plastic material containing 0.05 to 15.0 wt. % of a carbon black produced at more than 1300° C. from petroleum as the raw material or produced from natural gas or vegetable oil as the raw material.

* * * * *